(12) United States Patent
Starkey et al.

(10) Patent No.: US 8,096,347 B2
(45) Date of Patent: Jan. 17, 2012

(54) PIVOTABLE HEAT EXCHANGER MOUNTING

(75) Inventors: William P. Starkey, Chelmsford (GB); Timothy Oldland, Wickford (GB); Todd Richard, Heckmondwike (GB)

(73) Assignee: CNH America LLC, New Holland, PA (US)

( * ) Notice: Subject to any disclaimer, the term of this patent is extended or adjusted under 35 U.S.C. 154(b) by 984 days.

(21) Appl. No.: 11/947,925

(22) Filed: Nov. 30, 2007

(65) Prior Publication Data

US 2008/0283214 A1 Nov. 20, 2008

(30) Foreign Application Priority Data

Dec. 4, 2006 (GB) .................................. 0624198.8

(51) Int. Cl.
*B60K 11/04* (2006.01)
*F01P 3/18* (2006.01)
*F01P 11/06* (2006.01)
(52) U.S. Cl. ................ 165/41; 165/51; 165/67; 165/77; 165/78; 165/86; 165/95; 165/140; 180/68.4; 123/41.31; 123/41.33; 123/41.43; 123/563
(58) Field of Classification Search .................... 165/41, 165/86, 77, 78, 67, 140, 51, 95; 180/68.4, 180/68.1; 123/41.33, 41.31, 563, 41.43
See application file for complete search history.

(56) References Cited

U.S. PATENT DOCUMENTS

| 2,626,066 | A | * | 1/1953 | Rasmussen | ................... 222/450 |
| 4,696,361 | A | | 9/1987 | Clark | |
| 6,907,916 | B2 | * | 6/2005 | Koyama | .......................... 165/67 |
| 7,398,847 | B2 | * | 7/2008 | Schmitt | ........................ 180/68.4 |
| 2003/0168269 | A1 | | 9/2003 | Pfusterschmid | |

FOREIGN PATENT DOCUMENTS

| EP | 947780 A2 * | 10/1999 |
| EP | 1098073 | 5/2003 |
| JP | 09089488 A * | 4/1997 |
| JP | 2000212995 A * | 8/2000 |

* cited by examiner

*Primary Examiner* — John Ford
(74) *Attorney, Agent, or Firm* — Patrick M. Sheldrake; Michael G. Harms

(57) ABSTRACT

A cooler block for an agricultural tractor comprising a cooler assembly mounted on a radiator and coupled to the radiator by upper and lower linkages. The cooler assembly can be moved between a first position in which the cooler assembly lies parallel to the radiator and a second position in which the cooler assembly is inclined relative to the radiator. The cooler assembly is pivotable about a pivot in the upper linkage that is itself movable relative to the radiator. The lower linkage allows the entire cooler assembly to rise and the pivot of the upper linkage to move away from the radiator as the cooler assembly is pivoted from the first to the second position. A detent is incorporated into one of the two linkages to retain the cooler assembly in the second position.

9 Claims, 3 Drawing Sheets

PIVOTABLE HEAT EXCHANGER MOUNTING

FIELD OF THE INVENTION

The present invention relates to the mounting of heat exchangers in agricultural vehicles, in particular to a cooler block for use in tractors.

BACKGROUND OF THE INVENTION

Tractors have several heat exchangers which form part or different cooling systems. For example, a heat exchanger, normally termed a radiator, is required for cooling water circulating in the engine. A second heat exchanger is used to cool oil circulating in the transmission system and a further heat exchanger is used to cool the engine charge air. The latter two heat exchangers are commonly referred to as coolers. All three of these heat exchangers, form a cooler block located at the front of the tractor so that a single electric or engine driven radiator fan can suck ambient air through all of them.

Since agricultural vehicles are usually operated in an environment with considerable air pollution, the vehicle's coolers need to be cleaned from time to time. To clean the coolers, they must first be separated from each other so that they are accessible from the rear. This, however, is not easy to put into practice in the case of agricultural vehicles, as the space available for the cooler block is severely restricted by the wheels and the frame as well as the front lifting gear and possibly necessary ballast weights.

This problem is addressed in US 2003/0168269 in which the cooler block contains at least a front cooler, a central cooler, and a rear cooler. The rear cooler is attached at a fixed position on the frame of the agricultural tractor and the central cooler can be moved, away from the rear cooler while the front cooler can also be moved away from the central cooler. The front cooler is suspended so that is can move sufficiently upwards and, if necessary, also forwards, that the central cooler can be swung away from the rear cooler unhindered to the side at about a right angle.

This arrangement is somewhat complicated owing to the fact that three coolers are arranged in series, one behind the other. However, as the area of the radiator for the engine coolant is normally larger than the area of the coolers for the transmission oil and the charge air, it is possible to simplify the construction of the cooler block by positioning the latter two coolers in the same plane as one another in front of the radiator so that air need only be sucked through two coolers arranged in series, not three.

FIG. 1 of the accompanying drawings shows a known cooler block in which the transmission oil cooler and the air charge cooler together form a cooler assembly 12 that is mounted for pivotal movement relative to a radiator 10, to allow the two to be separated for cleaning. On each side of the radiator 10, the cooler assembly 12 is supported by means of a spigot 14 that rests in a groove 16 in a top bracket 18 mounted on the radiator 10. To prevent the cooler assembly 12 from separating completely from the radiator 10, a lower bracket 20 is firmly secured to the cooler assembly 12 and it is formed with a groove 22 in the form of a circular arc centred on the spigot 14 which receives a pin 24 projecting from the side of the radiator 10. This mounting allows the cooler assembly to pivot about the spigot 14 through an angle determined by the length of the groove 22 but not to be lifted off the bracket 18.

This mounting has certain disadvantages, one being that the cooler assembly at its upper end can only pivot about the spigot 14, which does not create much separation between the cooler assembly 12 and the radiator 10 for cleaning purposes. Furthermore, when the lower end of the cooler assembly 12 is pivoted away from the radiator, stays or gas struts are needed to maintain it in the separated position. These gas struts may assist in the movement of the cooler assembly in one direction but they interfere with movement in the opposite direction. Furthermore, they can hinder access to the space created between the cooler assembly and the radiator for cleaning purposes.

OBJECT OF THE INVENTION

The present invention seeks therefore to improve the mounting of a cooler assembly on a radiator in a cooler block so that the cooler assembly can be retained in a separated position without the use of stays.

SUMMARY OF THE INVENTION

In accordance with the present invention, there is provided a cooler block for an agricultural tractor comprising a cooler assembly mounted on a radiator and coupled to the radiator by means of upper and lower linkages to allow the cooler assembly to be moved between a first position in which the cooler assembly lies parallel to the radiator and a second position in which the cooler assembly is inclined relative to the radiator, characterised in that the cooler assembly is pivotable about a pivot in the upper linkage that is itself movable relative to the radiator, and the lower linkage is such that the entire cooler assembly rises and the pivot of the upper linkage moves away from the radiator as the cooler assembly is pivoted from the first to the second position and in that a detent is incorporated into one of the two linkages to retain the cooler assembly in the second position.

Preferably, the upper linkage comprises a bracket rigidly secured to the radiator and having a groove for receiving a spigot which projects from the cooler assembly and serves as the pivot, and wherein the lower linkage is such that the spigot slides along the groove to raise the upper end of the cooler assembly and to move it away from the radiator as the cooler assembly pivots about the spigot.

The detent for retaining the cooler assembly in the second position may suitably be formed by a depression in the groove of the upper linkage.

To ease the movement of the cooler assembly, the spigot of the upper linkage is advantageously fitted with an anti-friction bearing, i.e. a bearing with rolling bearing elements such as balls, needles or rollers.

In the preferred embodiment of the invention, the lower linkage comprises a bracket rigidly secured to the cooler assembly and having a groove receiving a pin projecting from the radiator, the groove being inclined in such a manner as to move the lower end or cooler assembly away from the radiator as the cooler assembly is pivoted about the pivot of the upper linkage.

Once again, the pin engaging in the groove of the bracket of the lower linkage may be fitted with an anti-friction bearing to ease movement of the cooler assembly.

As an alternative or an addition to the depression in the groove of the upper linkage, a depression may be formed in the groove of the bracket secured to the cooler assembly to serve as a detent for retaining the cooler assembly in the second position.

Advantageously, a catch is provided to retain the cooler assembly in the first position relative to the radiator.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
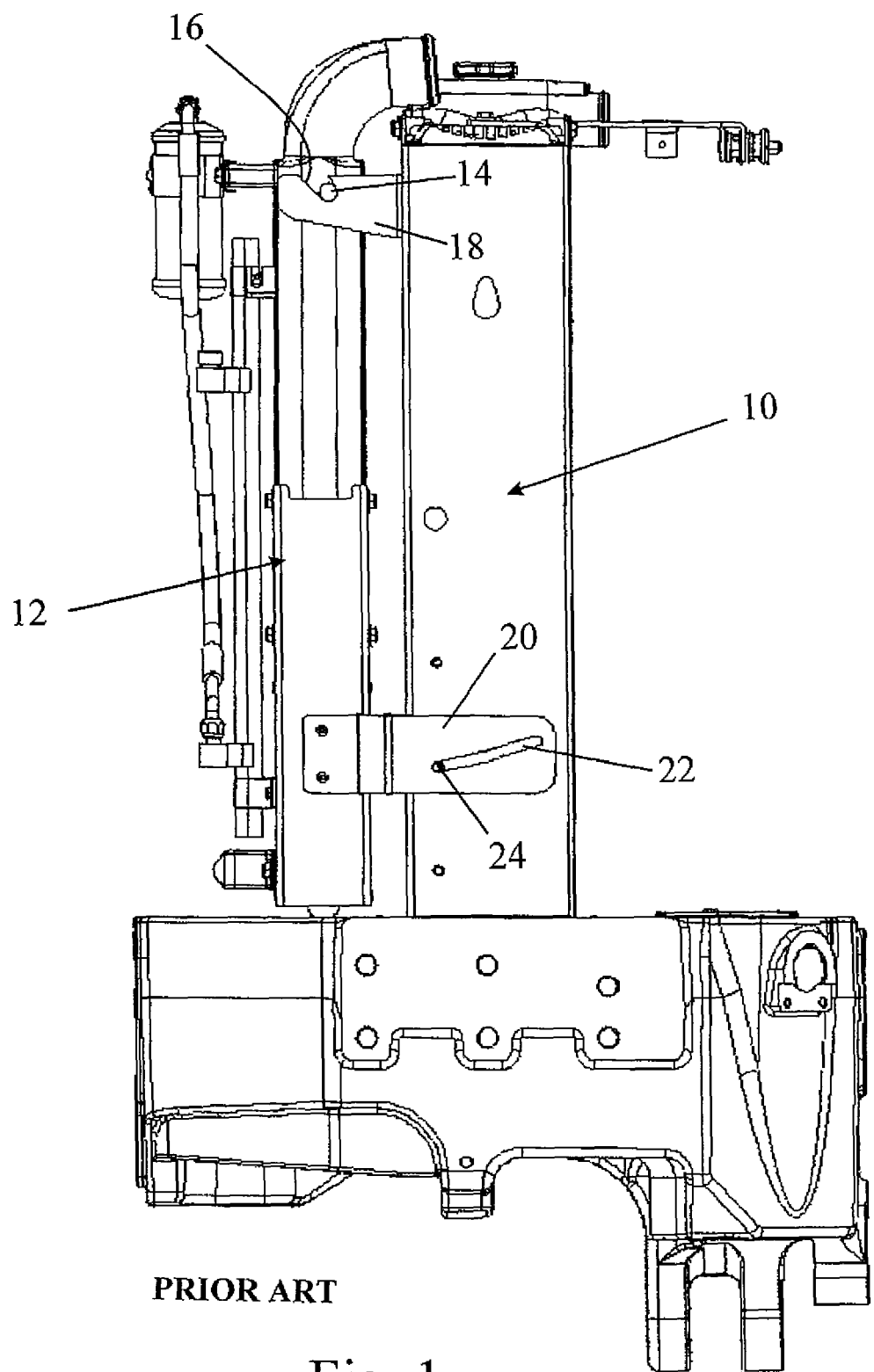
FIG. 1 is a side view of a known cooler block as described above.

The embodiment of the invention shown in FIGS. 2 and 3 bears many similarities to the prior art embodiment previously described by reference to FIG. 1. To avoid repetition like components have been allocated the same reference numerals while a prime has been added to the reference numeral of any component that has been modified.

Figure 2:
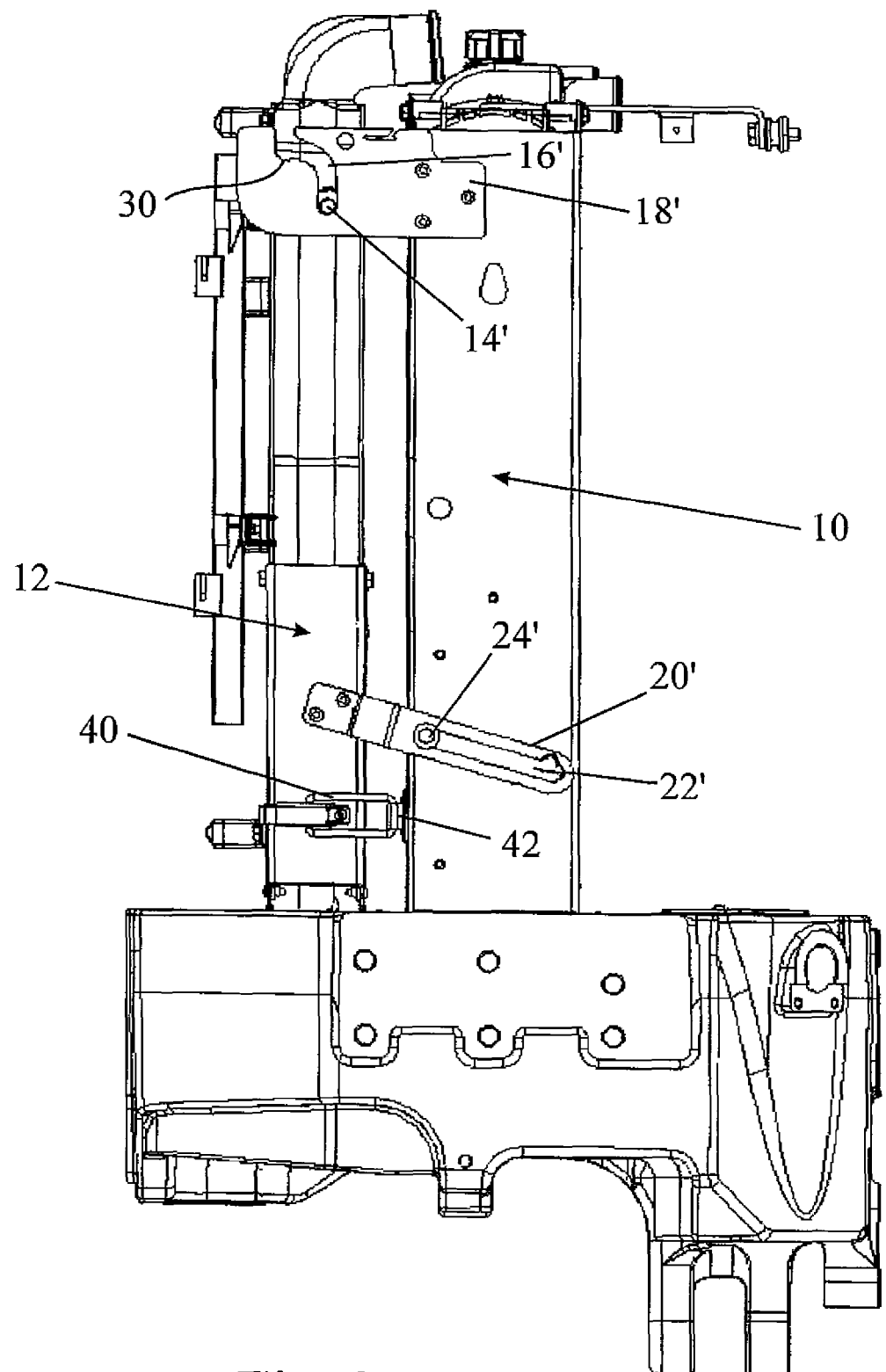
FIG. 2 is a similar side view of a cooler block of the present invention.

From a brief comparison of FIGS. 1 and 2, it will be seen that the brackets 18' and 20' are different from the corresponding bracket 18 and 20 used in the prior art, in particular the shape of the grooves 16' and 22' has been significantly modified.

In the prior art, the shape of the groove 16 is unimportant because after the spigot 14 has dropped into the bottom of the groove 16, the spigot 14 never moves. Furthermore, as the groove 22 is substantially an arc centred on the spigot 14, the bracket 20 serves only to limit the angle through which it is possible to swing the cooler assembly 12. The bracket 20 does not support any part of the weight of the cooler assembly nor does it hold the cooler assembly 12 stationary in any position.

Figure 3:
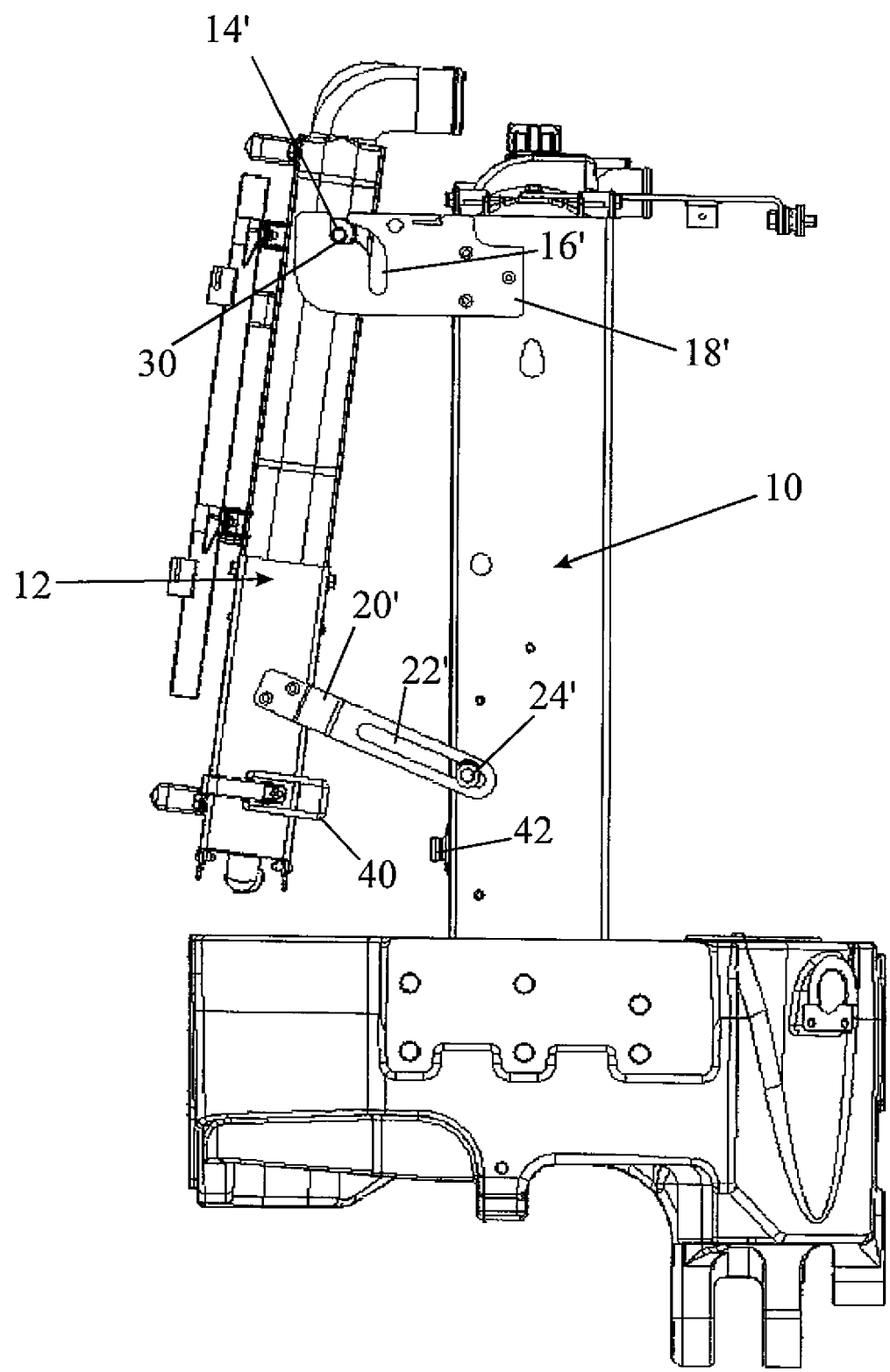
FIG. 3 shows the cooler block of FIG. 2 with the cooler assembly separated from the radiator.

The groove 22' in the embodiment of the invention shown in FIGS. 2 and 3, is not equidistant from the spigot 14' at all points along its length. As a result, as shown by comparing FIGS. 2 and 3, as the lower end of the cooler assembly 12 is pulled away from the radiator 10, the cooler assembly 12 not only pivots about the spigot 14' but it also rises and the spigot 14' is forced to move along the groove 16'.

The shape of the groove 14' is not a straight line but is an upwardly convex curve which is additionally formed at its end with a depression 30. In the first position of the cooler assembly 12 shown in FIG. 2, most of its weight is supported by the spigot 14' abutting the end of the groove 16'. As the cooler assembly is pivoted towards its second position, shown in FIG. 3, substantially all its weight is initially taken up by the pin 24' which rides in the grooves 22'. When the spigot 14' reaches the horizontal section of the groove 16', it again supports the weight of the cooler assembly 12. Thus when the spigot 14' eventually drops into the depression 30 and the cooler assembly 12 reaches its second position, the weight of the cooler assembly 12 acts to maintain the spigot 14' in the depression 30 and the latter therefore acts as a detent preventing the cooler assembly 12 from returning under the force of gravity to its first position. At the same time, the interaction between the pin 24' and the groove 22' ensures that the cooler assembly 12 remains pivoted away from the radiator 10 as shown in FIG. 3. If desired, a depression can be formed in the groove 22' to act in a similar manner as a detent, in addition to or instead of the depression in the groove 16'. To return from the second position to the first, it is necessary to both lift the cooler assembly 12 and tilt it at the same, time in order to move the spigot 14' out of the depression 30. Once the spigot 14' has cleared the depression 30, it is only necessary to pivot the cooler assembly 12 back towards its upright first position as its weight will assist in returning it to its first position.

In the prior art, the spigot 14 did not move along the groove 16 therefore there was not friction between the spigot 14 and groove 16. Likewise, the pin 24 did not support the weight of the cooler assembly 12 and friction between the cooler assembly and the groove 22 did not pose a problem. Neither of these conditions holds true in the present invention and friction at either of the grooves 16' and 22' would make it more difficult to move the cooler assembly 12.

For this reason, in the preferred embodiment of the invention the spigot 14' and the pin 24' are modified by being fitted with a roller bearing to reduce the friction between them and the grooves in which they slide.

The embodiment of the invention shown in FIGS. 2 and 3 further may have a releasable catch 40, 42 which holds the cooler assembly 12 in the first position. If the cooler assembly 12 were to rely only on its weight to maintain itself in its first position during normal operation of the vehicle, then it could be jogged up and down and at the same time pivoted towards and away from the radiator 10 when the vehicle is driven over uneven ground. The catch 40, 42 therefore server, to protect the cooler block from damage while the vehicle is operated over rough terrain.

The invention claimed is:

1. A cooler block for an agricultural tractor comprising:
   a radiator;
   a cooler assembly coupled to the radiator by upper and lower linkages; the linkages configured to permit positioning of the cooler assembly in at least a first position in which the cooler assembly is generally parallel to the radiator and a second position in which the cooler assembly is inclined relative to the radiator;
   wherein the cooler assembly is pivotable about a pivot in the upper linkage, and the pivot is mounted such that the pivot is also movable with respect to the radiator; and
   the lower linkage comprising a bracket rigidly secured to the cooler assembly and having a groove receiving a projection from the radiator, wherein the groove path is shaped to move the lower end of cooler assembly away from the radiator as the cooler assembly is pivoted about the pivot of the upper linkage such that the entire cooler assembly and the pivot of the upper linkage are displaced laterally away from the radiator as the cooler assembly is pivoted from the first to the second position.

2. The cooler block of claim 1, wherein the upper linkage comprises a bracket rigidly secured to the radiator and having a groove for receiving a spigot, the groove extending both upward and laterally away from the radiator, the spigot projects from the cooler assembly and serves as the pivot, and the groove for receiving a spigot is configured such that when the cooling assembly is in the first position and the lower end of the cooling assembly and linkage is moved laterally away from the radiator the spigot slides along the groove to raise the upper end of the cooler assembly and to move the spigot laterally away from the radiator moving the cooling assembly towards the second position as the cooler assembly pivots about the spigot.

3. The cooler block of claim 2, wherein the spigot of the upper linkage is fitted with an anti-friction bearing.

4. The cooler block of claim 1, wherein the projection is a pin engaging in the groove of the bracket of the lower linkage and is fitted with an anti-friction bearing.

5. The cooler block of claim 1, wherein a catch is provided to retain the cooler assembly in the first position relative to the radiator.

6. The cooler block of claim 1, wherein a detent is incorporated into at least one of the two linkages to retain the cooler assembly in the second position.

7. The cooler block of claim 6, wherein the detent for retaining the cooler assembly in the second position comprises a depression in the groove of the upper linkage.

8. The cooler block of claim 1, wherein the groove in the lower bracket is not equidistant from the pivot at all points along the length of the groove.

9. The cooler block of claim 1, wherein the linkages are configured such that in a first position the upper linkage supports a greater amount of weight of the cooler assembly than the lower linkage and during movement between the first and second positions the lower linkage supports a greater amount of the weight of the cooler assembly than the upper linkage.

* * * * *